April 13, 1948.  M. M. SEELOFF  2,439,783
FLASH WELDER CONSTRUCTION
Filed Oct. 8, 1945   2 Sheets-Sheet 1

Inventor
MELVIN M. SEELOFF
By Francis J. Klempay
Attorney

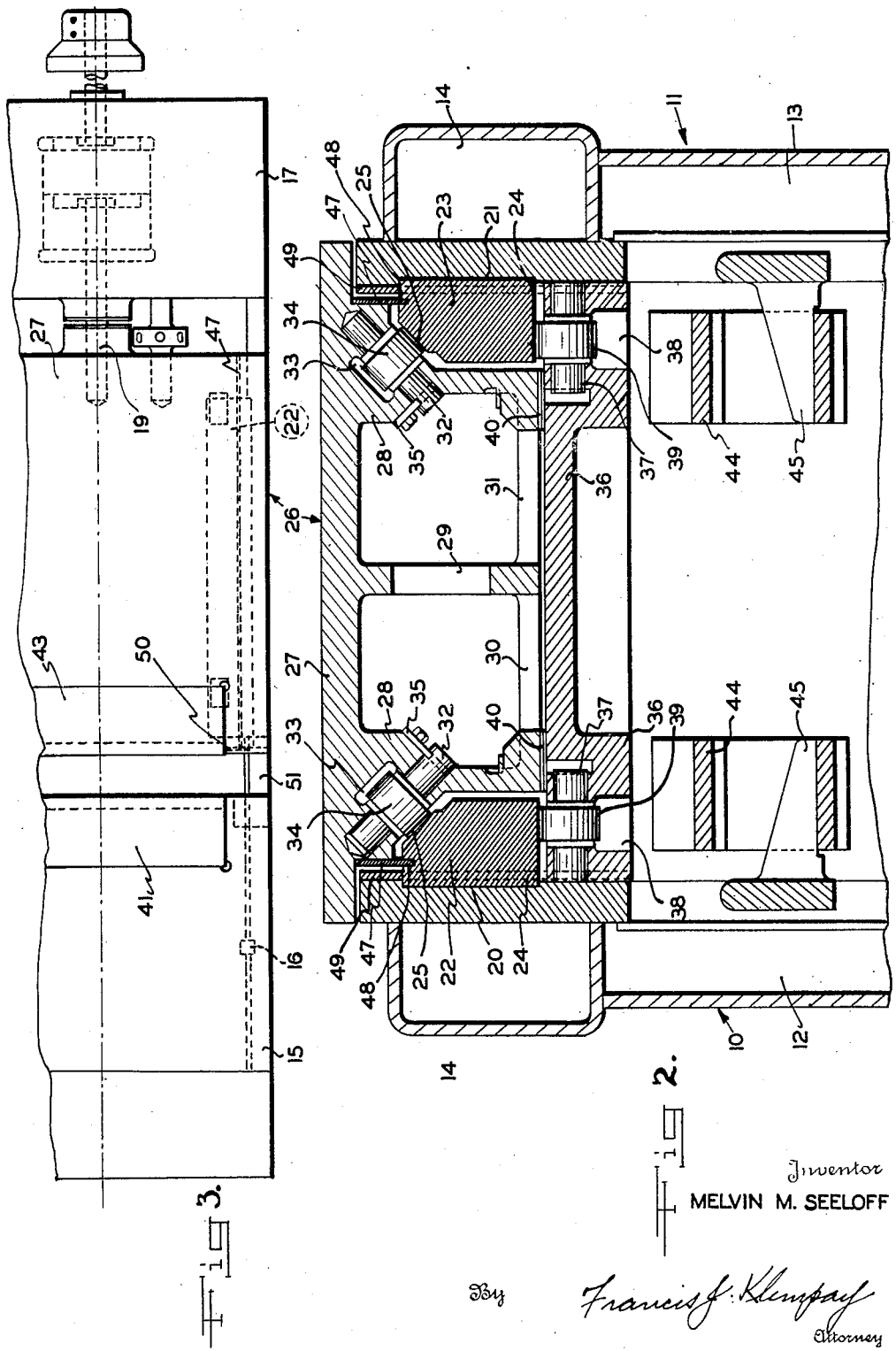

Patented Apr. 13, 1948

2,439,783

UNITED STATES PATENT OFFICE 2,439,783

FLASH WELDER CONSTRUCTION

Melvin M. Seeloff, Warren, Ohio, assignor to The Taylor-Winfield Corporation, Warren, Ohio, a corporation of Ohio Application October 8, 1945, Serial No. 620,934

13 Claims. (Cl. 219—4)

1

This invention relates to the art of electric resistance welding and more particularly to improved features of construction of an electric flash-butt welding machine. As normally constituted, such machines have a rigid frame mounting a fixed platen, a movable platen, means to drive the movable platen, and a welding transformer as well as the secondary circuit connections therefor. For welding results of consistent quality the relative movement of the platens carrying the two work pieces to be joined must be precisely controlled and this requires accurate guiding as well as freedom from chattering and freedom from excessive starting and operating friction. The primary object of the present invention is to provide a practical but materially improved arrangement for movably mounting and guiding the movable platen in the welding machine. A further object of the invention is to provide an electric flash-butt welding machine wherein improved mechanical operating characteristics are attained while yet retaining all the advantages of the improved electrical equipment heretofore proposed for such machines.

The present invention is an improvement over the construction of electric flash-butt welding machine disclosed and claimed in my co-pending application Ser. No. 598,096, filed June 7, 1945, now Patent No. 2,430,787, dated November 11, 1947.

The above objects are accomplished, primarily, by providing either the rigid frame or the movable platen with heavy longitudinally extending supporting gibs each having hardened and ground bearing surfaces and by providing anti-frictionally mounted supporting rollers on the other member for engaging said bearing surfaces. Further, means is provided to adjustably preload the interengagement of the rollers and bearing surfaces so that the platen will have uniform and accurately guided movement. An important aspect of the invention is that the above objects and advantages are accomplished with simplifying and assembly facilitating features of construction of the component parts. Moreover, such parts may readily be produced in quantity, stocked, and utilized at any subsequent time for the ready assembly of welders of varying capacity and arrangement. By accurately grinding the gibs and employing suitable drilling or boring jigs to insure accuracy in the location and angular relation of the rollers interchangeability of the parts is possible and assembly of the welders thus made a comparatively easy task.

A more specific object of the invention is to

2 provide an electric flash-butt welding machine in which the supporting and guiding means for the movable platen lends strength and rigidity to the completed structure. Such reinforcement is provided by the gibs in the present construction.

Yet another object of the invention is to provide, in an electric flash-butt welder having an anti-frictionally mounted movable platen, improved arrangements for preventing flash materials from entering in or about the platen supporting and guiding mechanism.

The above and other objects and advantages of the invention will become apparent upon consideration of the following detailed specification and accompanying drawing wherein there is disclosed a preferred embodiment of the invention.

Referring to the drawing:

Figure 2 is a transverse section through the upper portion of the machine of Figure 1; and Figure 3 is a partial plan view of the machine of Figure 1.

Figure 1:
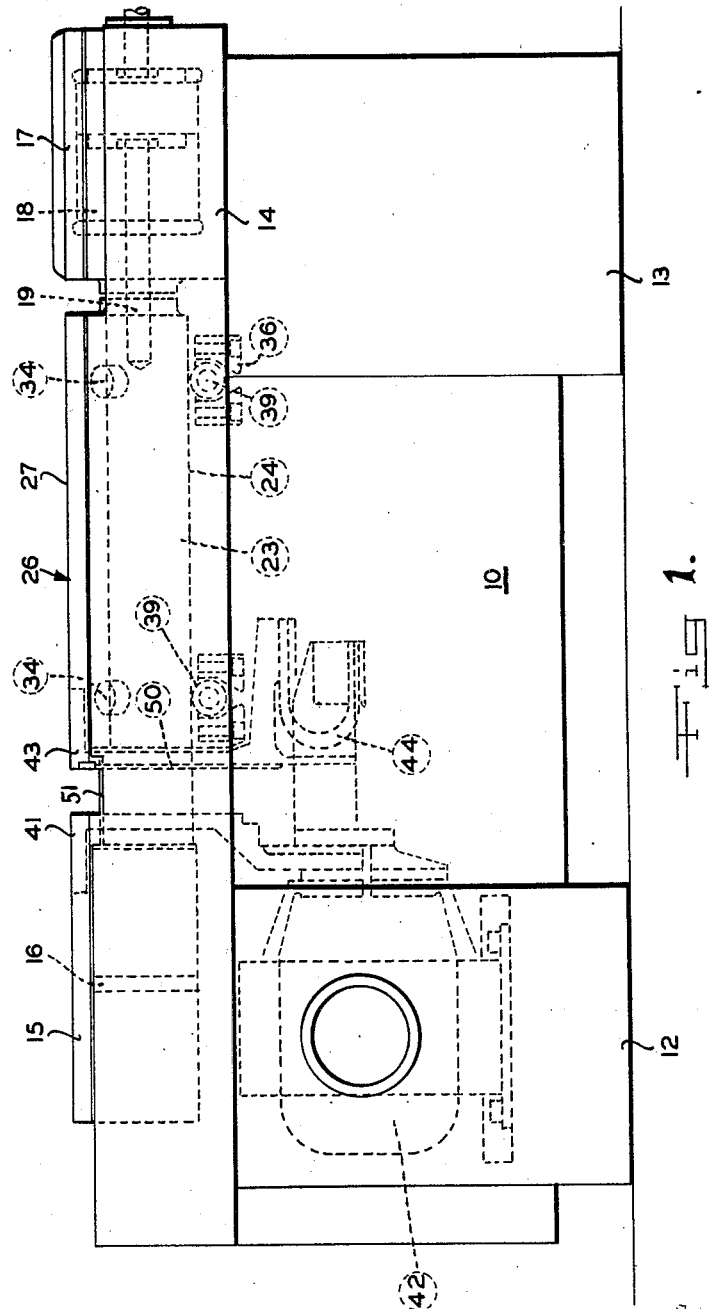
Figure 1 is a side view of an electric resistance flash-butt welding machine constructed in accordance with the principles of the invention.

The main frame of the welding machine illustrated comprises a pair of unitary plate-like side members 10 and 11 which may be either cast or fabricated from steel plate stock as desired. As shown, each of the side members 10 and 11 may be provided with a pair of spaced pedestal portions 12 and 13 and an upper horizontal rail portion 14. The resulting box-like structure has ample strength and rigidity to oppose the expansive and other forces normally encountered in machines of the kind involved.

The members 10 and 11 are rigidly connected together by a fixed platen structure 15 which preferably has surfaces overlying the top edges of the members 10 and 11 and which has side surfaces having abutting engagement with the inner surfaces of the members 10 and 11. It will be understood that, in actual practice, a number of transversely and vertically extending cap screws or other suitable fastening elements will be employed to rigidly interconnect the parts 10, 11 and 15. Further, to prevent loosening of the platen assembly 15 and to oppose the heavy horizontal thrust applied to the platen 15 at the time of upset during the welding cycle I provide a vertically disposed key 16 on either side of the platen, the keys 16 lying in grooves formed in the side walls of the platen 15 and in the inner faces of the members 10 and 11. Members 10 and 11 are further rigidly connected together by a block 17 which has lips overlying the top edges of the side members 10 and 11 and depending side surfaces which lie against the inner side surfaces of members 10 and 11. Suitable means, not shown, is provided to rigidly interconnect the members 10, 11 and 17 and to oppose any tendency of the block 17 to drift longitudinally in the frame. Block 17 contains a cylinder 18 having a piston therein connected with an operating rod 19.

Snugly received in longitudinally extending grooves 20 and 21 formed in the inner faces of the members 10 and 11, respectively, is a pair of heavy steel gibs 22 and 23, each of which has a hardened and ground bottom horizontal surface 24 and a hardened and ground angular top surface 25. Suitable bolts or cap screws, not shown, are employed to rigidly retain the gibs 22 and 23 in grooves 20 and 21. The gibs 22 and 23 provide a rigid track for mounting and guiding a movable platen assembly of the welding machine and in the drawing such assembly is designated by the reference numeral 26.

Platen 26, preferably a casting, has an upper plate 27 and integral downwardly extending side struts 28 which are contoured on their outer side faces generally complementary to the shape of the gibs 22 and 23. As in the case of the members 15 and 17, the top plate 27 of the platen assembly 26 extends laterally out over the top edges of the frame side members 10 and 11. Platen structure 26 also includes a centrally disposed longitudinally extending vertical web 29 and integral longitudinally spaced but transversely extending struts 30 and 31 interconnecting the bottom edges of the side struts 28 with the bottom edges of the web 29, thus providing a rigid integral box-like platen structure of great strength without excessive weight.

The upper portions of struts 28 are drilled angularly in an upward and outward direction to receive pins 32. Two of such pins are provided along either side of the platen structure in longitudinally spaced relation. Further, recesses 33 are machined in the bodies of the struts 28 to receive the hardened steel rollers 34 which are anti-frictionally mounted on the pins 32 by means of needle bearings, not shown. Pins 32 are retained in their sockets by means of lugs 35 which are detachably fastened to the struts 28 and engaged in grooves or other recesses formed in the pins 32 as will be understood.

In accordance with usual practice a bar 41 of copper or other good electrical conducting material is secured to platen 15, having a portion lying in the upper plane surface of the platen and another portion extending downwardly across the inner face of the platen, and is electrically connected to one of the terminals of a welding transformer 42 which is preferably housed between the members 10 and 11 and below the platen 15. A similar current conductor bar 43 is affixed to the movable platen 26 and has a forked lower end which is rigidly secured to flexible current conducting bands 44. As illustrated and explained more fully in the above mentioned co-pending application, bands 44 are electrically and mechanically connected with the free ends of arms 45 which project longitudinally outward of the opposite terminal of the welding transformer 42. As mounted, bands 44 have a tendency to exert an upward thrust on the movable platen particularly when the movable platen moves closer toward the fixed platen 15 but in the construction herein described such thrust is effectively parried by the antifriction rollers 39 which are adjacent the cleft between the platens.

In the normal operation of flash-butt machines a great amount of metallic particles, scale and slag is exuded from the welding zone and with apprecible velocity and it is essential that this material be kept away from the supporting and guiding surfaces of the movable platen supporting mechanism. In connection with the machine herein disclosed the welding normally takes place immediately above the open cleft between the fixed and movable platens, it being understood that the work supporting clamp fixtures for the two pieces to be welded together are carried by their respective platens while the current conductor electrodes therefor are electrically connected with the bars 41 and 43. The downwardly extending skirt of these bars prevent much flash material from entering the workings in the base of the machine and to augment these barriers I position the following protector plates in the machine.

A longitudinally extending flash barrier plate 47 is secured to either side of the movable platen against vertically extending shoulders spaced inwardly from the outer top edges of the platen. The lower edges of the plates 47 are slidably received in longitudinally extending grooves 48 formed in the gibs 22 and 23. As indicated in Figure 3, the plates 47 extend the full length of the platen 26. Lying against the inner faces of the side members 10 and 11 contiguous to the welding zone ends of the gibs 22 and 23 are the plates 49 and to form a seal between the plates 47 and 49 I provide small transversely extending plates 50 (Figure 3). To protect the top edges of the frame members 10 and 11 at the welding zone I overlie these top edges at this point with the plates 51. It will be observed particularly that the plates 49 and 50, in conjunction with the downwardly extending skirt of the conductor bar 43, effectively block off the spaces about the bearing surfaces 24 and 25 and about the rollers 34 and 39 from the welding zone so that flash particles are prevented from accumulating on or about these rollers and supporting surfaces. In this manner the machine is made capable of operating for long periods with minimum maintenance.

In accordance with usual practice, the fixed platen of the machine will be fully insulated from its supporting frame by means of insulating sheathing as will be understood.

It should now be apparent that I have provided an improved construction of flash-butt welding machine which accomplishes the objects initially set out. By the use of relatively few but rugged parts I am enabled to assemble a welding machine having improved mechanical characteristics as regards durability and ease and consistency of operation and improved electrical characteristics as regards electrical losses and impedance. An important aspect of the present invention is that the same provides an entirely practical construction for a machine having the above outlined improved characteristics in that the design of the component parts as well as the general arrangement of the machine facilitates precision production of the welders. This is illustrated, for example, in the mounting of the pins 32 in bores formed directly in the mass of material making up the movable platen of the machine and in the location of such bores whereby the same may readily be precisely machined with normally available machine tools. Further, the arrangement and design of the component parts of the machine is such that the assembly of the principal parts is a comparatively simple operation, requiring only the setting of shims 40 as a critical adjustment.

It is within the purview of the present invention that the guiding surfaces (24 and 25) may be formed on the platen either integral therewith or on gibs secured thereto and coacting rollers journaled on the fixed frame of the machine and provided with suitable adjustments for preloading the bearings thereof as explained above. Other modifications will readily suggest themselves and it should therefore be understood that the specifically illustrated embodiment of the invention is representatively only as obviously a number of changes may be made therein without departing from the spirit or scope of the invention. Reference should therefore be had to the appended claims in determining the scope of the invention.

What I claim is:

1. In an electric resistance flash-butt welder the combination of a rigid frame comprising a pair of spaced and generally parallel plate-like side members, a normally fixed platen assembly interposed between said side members adjacent one end thereof and rigidly interconnected therewith, a bracket interposed between said side members adjacent the opposite end thereof and rigidly interconnected therewith, a longitudinally extending gib rigidly mounted on the inner face of each said side members and extending horizontally between said fixed platen and said bracket but below the top edges of said side members, said gibs having horizontal bottom bearing surfaces and outwardly inclined upper bearing surfaces, said bearing surfaces extending uniformly in a longitudinal direction; and a movable platen adapted to be moved by means supported on said bracket and carrying rollers for engaging said bearing surfaces whereby said movable platen is anti-frictionally mounted and effectively guided for movement in a longitudinal direction.

2. In an electric resistance flash-butt welder the combination of a rigid frame comprising a pair of spaced and generally parallel plate-like members, a normally fixed platen assembly interposed between said side members adjacent one end thereof and rigidly interconnected therewith, a bracket interposed between said side members adjacent the opposite ends thereof and rigidly interconnected therewith, a horizontal longitudinally extending recess in the inner face of each of said side members, a longitudinally extending gib snugly received in each of said recesses and extended horizontally between said first mentioned platen and said bracket but below the top edges of said side members, said gibs having upper and lower longitudinally extending bearing surfaces, a movable platen adapted to be moved by means supported on said bracket and carrying rollers for engaging said bearing surfaces whereby said movable platen is anti-frictionally mounted and effectively guided for movement in a longitudinal direction.

3. Apparatus according to claim 1 further characterized in that said movable platen is provided with a removable horizontal bottom bracket for carrying the rollers which engage the bottom bearing surfaces of said gibs, said bottom bracket being shimmed to the bottom surface of said platen whereby the interengagement of said rollers and bearing surface may be pre-loaded during assembly.

4. In an electric resistance flash-butt welder having a frame mounting a pair of spaced parallel gibs each having a horizontal bottom bearing surface and an upwardly and outwardly inclined upper bearing surface, said bearing surfaces extending longitudinally of said frame, and a movable platen having anti-frictionally mounted rollers engaging said bearing surfaces whereby said platen is effectively guided for movement in a longitudinal direction, said platen being provided with a detachable bracket for mounting the rollers which engage the bottom bearing surfaces of said gibs, said bracket being shimmed to the bottom surface of said movable platen whereby the interengagement of the rollers and bearing surfaces may be preloaded during assembly.

5. Apparatus according to claim 4 further characterized in that each of said rollers is anti-frictionally journaled on a pin, said pins being retained in bores formed in the body of said platen.

6. In an electric resistance butt welder having a frame mounting a pair of spaced parallel gibs each having longitudinally extending angularly related upper and lower bearing surfaces, a platen structure having a plurality of angularly related bores, a pin received and retained in each of said bores, and rollers anti-frictionally journaled on said pins and engaging said bearing surfaces, said rollers having cylindrical peripheral surfaces to make line contact with said bearing surfaces.

7. Apparatus according to claim 6 further including means to adjust the vertical positions of the axes of certain of said pins whereby the pressure of the interengagement of said rollers with said bearing surfaces may be varied.

8. In an electric resistance flash-butt welder the combination of a rigid frame structure and a movable platen structure, a pair of spaced parallel gibs rigidly mounted on one of said structures and having longitudinally extending but angularly related upper and lower plane bearing surfaces, a plurality of pins received and retained in bores formed in the other of said structures, and supporting rollers journaled on said pins, said supporting rollers having such outer surfaces as to make line contact with said bearing surfaces.

9. Apparatus according the claim 8 further including means to shift the axes of certain of said pins whereby the pressure of the interengagement between said rollers and bearing surfaces may be varied.

10. In an electric resistance flash-butt welder the combination of a rigid frame having transversely spaced side members each mounting a longitudinally extending gib on its inner face, a movable platen structure anti-frictionally mounted and guided on said gibs for longitudinal movement; said platen structure comprising a box-like assembly having a top plate, transversely spaced depending struts extending generally parallel with said side members and gibs, and transversely extending struts interconnecting the lower portions of said first mentioned struts and spaced downwardly below said top plate.

11. Apparatus according to claim 10 further including bores in the upper portions of said first mentioned struts to receive and retain roller mounting pins, rollers journaled on said pins and having contact with upper bearing surfaces on said gibs, and a roller carrying bracket detachably secured to the bottom of said first mentioned struts and carrying the rollers engaging lower bearing surfaces formed on said gibs.

12. In an electric resistance flash-butt welder the combination of a rigid frame having plate-like side members each mounting a longitudinal extending gib on its inner face below the top edge thereof, each of said gibs having a longitudinally extending groove in its upper surface, a movable platen anti-frictionally mounted on said gibs for longitudinal movement, said platen having a plate-like top portion overlying the top edges of said side members above said gibs, and longitudinally extending flash barrier plates carried by said platen and depending downwardly into said grooves.

13. A movable platen for an electric resistance flash-butt welding machine comprising a hollow casting having a plate-like top portion, inwardly stepped depending side walls, transversely extending struts interconnecting the lower edges of said side walls, the upper portions of said side walls having downwardly and inwardly extending bores opened at their lower ends to receive roller mounting pins.

MELVIN M. SEELOFF.

REFERENCES CITED

The following references are of record in the file of this patent:

UNITED STATES PATENTS

| Number | Name | Date |
|---|---|---|
| 1,228,843 | Spire | June 5, 1917 |
| 1,654,563 | Taylor | Jan. 3, 1928 |